US005896467A

United States Patent [19]

Kim

[11] Patent Number: 5,896,467
[45] Date of Patent: Apr. 20, 1999

[54] METHOD AND APPARATUS FOR ENCODING A CONTOUR IMAGE OF AN OBJECT IN A VIDEO SIGNAL

[75] Inventor: Jin-Hun Kim, Seoul, Rep. of Korea

[73] Assignee: Daewoo Electronics Co., Ltd., Seoul, Rep. of Korea

[21] Appl. No.: 08/872,662

[22] Filed: Jun. 10, 1997

[30] Foreign Application Priority Data

Jan. 10, 1997 [KR] Rep. of Korea ............... 97-432

[51] Int. Cl.⁶ ............................................. G06K 9/36
[52] U.S. Cl. .................................................. 382/242
[58] Field of Search .......................... 382/232, 236, 382/238, 240, 242, 248, 250; 358/432, 433; 348/384, 394, 395, 400–404, 407–416, 420, 421, 425, 430, 431, 699

[56] References Cited

U.S. PATENT DOCUMENTS

| | | | |
|---|---|---|---|
| 5,691,769 | 11/1997 | Kim | 348/403 |
| 5,737,449 | 4/1998 | Lee | 382/242 |
| 5,774,595 | 6/1998 | Kim | 382/241 |
| 5,793,893 | 8/1998 | Kim | 382/242 |

*Primary Examiner*—Jose L. Couso
*Attorney, Agent, or Firm*—Anderson, Kill & Olick, P.C.

[57] ABSTRACT

A method for encoding a contour of an object decides a plurality of primary vertices on the contour based on a polygonal approximation technique and also determines a multiplicity of secondary vertices on the contour which are disposed at one of a predetermined set of locations away from a previously determined secondary vertex. Then, the method encodes position information of the primary vertices to provide encoded primary vertex data and codes position information of the secondary vertices to provide coded secondary vertex data. Finally, either the encoded primary vertex data or the coded secondary vertex data is selected as encoded contour data in response to a selection signal which is generated by estimating an encoding error with a threshold TH and the encoded contour data is provided to a transmitter for the transmission thereof.

18 Claims, 8 Drawing Sheets

METHOD AND APPARATUS FOR ENCODING A CONTOUR IMAGE OF AN OBJECT IN A VIDEO SIGNAL

FIELD OF THE INVENTION

The present invention relates to a method and apparatus for encoding a contour of an object in a video signal; and, more particularly, to a method and apparatus capable of encoding the contour through the use of an adaptive coding scheme based on an octant-based and an equal distance vertex coding techniques.

DESCRIPTION OF THE PRIOR ART

In digitally televised systems such as video-telephone, teleconference and high definition television systems, a large amount of digital data is needed to define each video frame signal since a video line signal in the video frame signal comprises a sequence of digital data referred to as pixel values. Since, however, the available frequency bandwidth of a conventional transmission channel is limited, in order to transmit the large amount of digital data therethrough, it is necessary to compress or reduce the volume of data through the use of various data compression techniques, especially, in the case of such low bit-rate video signal encoders as video-telephone and teleconference systems.

One of such techniques for encoding video signals for a low bit-rate encoding system is the so-called object-oriented analysis-synthesis coding technique, wherein an input video image is divided into objects and three sets of parameters for defining the motion, the contour and the pixel data of each object are processed through different encoding channels.

In processing a contour of an object, contour information is important for the analysis and synthesis of the object shape. A classical coding method for representing the contour information is a chain coding method, wherein position information of all the contour pixels is encoded. The chain coding method, however, requires a substantial amount of bits for the representation thereof, although the method does not incur any loss in the contour information.

To overcome the drawback of the chain coding method, therefore, there have been proposed several methods to encode the contour information, such as polygonal approximation, B-spline approximation and DST (Discrete Sine Transform) combined with a polygonal approximation technique. In such approximation techniques, the contour is approximated by line or curve segments, each connecting a pair of neighboring vertices determined on the contour; and the vertices are encoded based on, e.g., the so-called locally-adaptive octant-based vertex coding technique (see, e.g., International Organisation for Standardisation, Coding of Moving Pictures and Audio Information, ISO/IEC JTC1/SC29/WG11, Shape Coding AHG, Jul. 30, 1996, entitled "Revised Description of S4a: Geometrical Representation Method" by K. O'Connell, P. Gerken and J. H. Kim).

Figure 1:
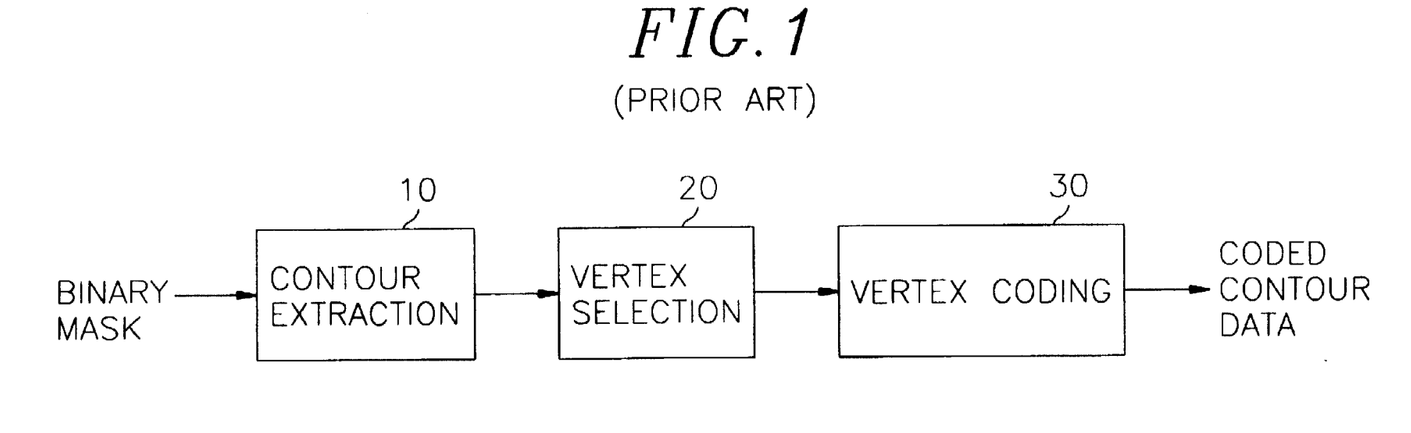
FIG. 1 shows a schematic block diagram of a conventional apparatus for encoding a contour of an object.

Referring to FIG. 1, there is shown a schematic block diagram of a conventional apparatus for encoding vertices of a contour of an object in a video signal based on the octant-based vertex coding method.

A binary mask is inputted to a contour extraction block 10, wherein each of the pixels in the binary mask is represented by one of the binary values, e.g., 0 or 1, depending on whether a pixel resides either within an object or in a background region.

The contour extraction block 10 extracts a contour of the object from the binary mask and provides the contour to a vertex selection block 20. The contour is made of contour pixels, each being an object pixel positioned on the boundary of the object.

The vertex selection block 20 selects a plurality of vertices by using a conventional iterated refinement method, e.g., polygonal approximation technique, wherein a pair of contour pixels separated by a maximum distance is determined first as starting vertices; and additional contour pixels are selected as vertices until a largest perpendicular distance from a line segment joining each pair of neighboring vertices to a contour segment defined by the pair of neighboring vertices does not exceed a preset threshold Dmax, the pair of neighboring vertices being adjacent each other along the contour. In the polygonal approximation technique, therefore, the degree of approximation is determined by the magnitude of the threshold Dmax.

At a vertex coding block 30, the vertices determined at the vertex selection block 20 are encoded based on, e.g., the so-called octant-based vertex coding technique.

Figure 2:
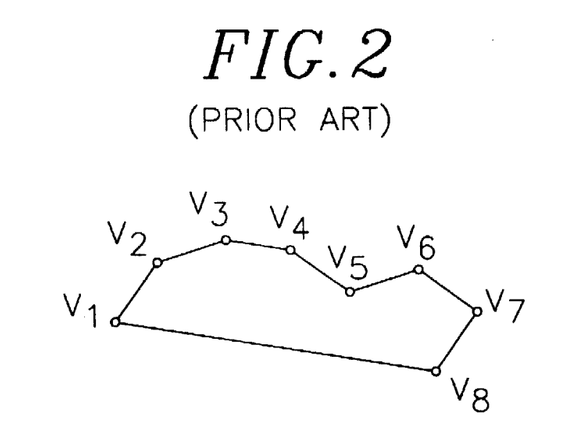
FIG. 2 illustrates a procedure for assigning a priority to vertices.

In the octant-based vertex coding technique, an x and a y components, $R(x)$ and $R(y)$, and their magnitudes, x_mag and y_mag, of a displacement R between every pair of neighboring vertices are calculated. Thereafter, two vertices corresponding to a largest magnitude among all the x_mag's and y_mag's are selected as an initial vertex and an end vertex of the contour. N, e.g., 8, vertices are then sequentially indexed along the contour starting from the initial vertex toward the end vertex as shown in FIG. 2. In FIG. 2, the x_mag corresponding to the pair of vertices $V_1$ and $V_8$ is largest among 8 pairs of x_mag's and y_mag's obtained from the vertices $V_1$ to $V_8$.

After determining the initial and the end vertices, an x_max_mag and a y_max_mag, the respective maximum values of x_mag's and y_mag's of the displacements $R_i$'s, are determined as an x_dynamic_range and a y_dynamic_range of the contour, respectively, wherein $R_i = V_{i+1} - V_i$ for $i=1, 2, \ldots, N-1$, wherein $V_i$ is a position vector representing the vertex $V_i$. Subsequently, the x_dynamic_range, the y_dynamic_range and the absolute position of the initial vertex $V_1$ are encoded, while each of the remaining vertices, i.e., $V_{i+1}$ for $i=1$ to $(N-1)$, is encoded based on the displacement R from its previous vertex $V_i$.

Figure 3:
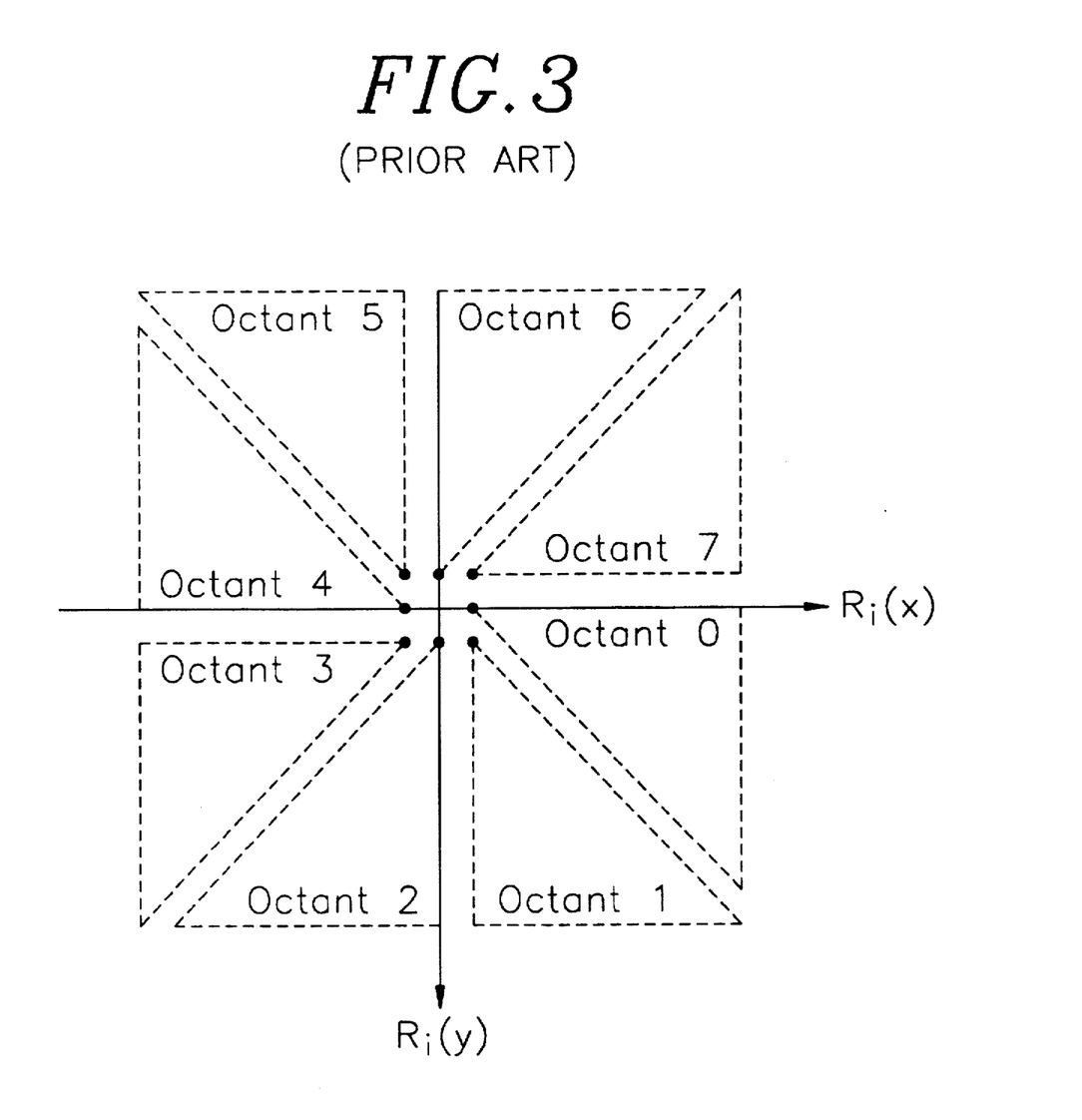
FIG. 3 describes an octant-based vertex coding technique.

Specifically, as shown in FIG. 3, an octant to which a vertex $V_{i+1}$ belongs is determined among octant 0 to octant 7 based on an x component $R_i(x)$ and a y component $R_i(y)$ of the displacement $R_i$, wherein the eight nearest neighbors to the origin (all marked by the closed circles in FIG. 3) represent the starting points of the eight octants.

After determining octants for the vertices $V_{i+1}$'s, the indices of the octants are coded by using the conventional differential chain coding technique; and the magnitudes of the components $R_i(x)$ and $R_i(y)$ representing the relative position of the vertex $V_{i+1}$ with respect to its preceding vertex $V_i$ are encoded using the bits determined based on the x_dynamic_range and the y_dynamic_range, respectively.

As another instance of the octant-based vertex coding technique, the octant indices and $R_i$'s are encoded alternatively through the use of the so-called syntax-adaptive arithmetic coding (SAAC). In the SAAC, the number of possible symbols is dependent on the dynamic range maximum, i.e., max(x_dynamic_range, y_dynamic_range). For further details of the octant-based vertex coding technique, see K. O'Connell et al., supra.

By virtue of the process of ordering the vertices as described above, the amount of data representing the vertices can be effectively reduced in the octant-based vertex coding technique since each vertex excepting the initial one is represented by the octant it belongs to and the magnitudes of $R_i(x)$ and $R_i(y)$; and the number of bits needed in encoding the magnitudes directly depends on the x_dynamic_range and the y_dynamic_range.

However, such conventional contour coding method may still require an unnecessarily large amount of bits in representing the vertices, especially in the case where most x_mag's and y_mag's are considerably smaller than the x_dynamic_range and the y_dynamic_range or there exist a large number of closely displaced vertices, which are apt to occur when the threshold Dmax is of a small magnitude.

SUMMARY OF THE INVENTION

It is, therefore, a primary object of the invention to provide an improved method and apparatus for encoding a contour of an object, which is capable of effectively encoding the contour.

In accordance with the invention, there is provided a method for encoding a contour of an object, the contour having contour pixels thereon, comprising the steps of:

(a) deciding a multiplicity of primary vertices on the contour, wherein the contour is divided into a multiple number of primary contour segments, each primary contour segment having a pair of primary vertices at the ends thereof, and a perpendicular distance from a line segment joining the pair of primary vertices to any point of said each primary contour segment being smaller than a threshold Dmax;

(b) sequentially determining a plurality of secondary vertices on the contour, wherein the contour is partitioned in a plurality of secondary contour segments, each secondary contour segment having a pair of secondary vertices at the ends thereof, a secondary vertex being disposed at one of a predetermined set of locations away from a previously determined secondary vertex and a distance between two neighboring secondary vertices being greater than one pixel;

(c) encoding position information of the primary vertices to provide encoded primary vertex data;

(d) coding position information of the secondary vertices to provide coded secondary vertex data;

(e) estimating an encoding error with a threshold TH; and (f) providing, as encoded contour data, the encoded primary vertex data if the encoding error is greater than the threshold TH, and the encoded secondary vertex data if otherwise.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 4A:
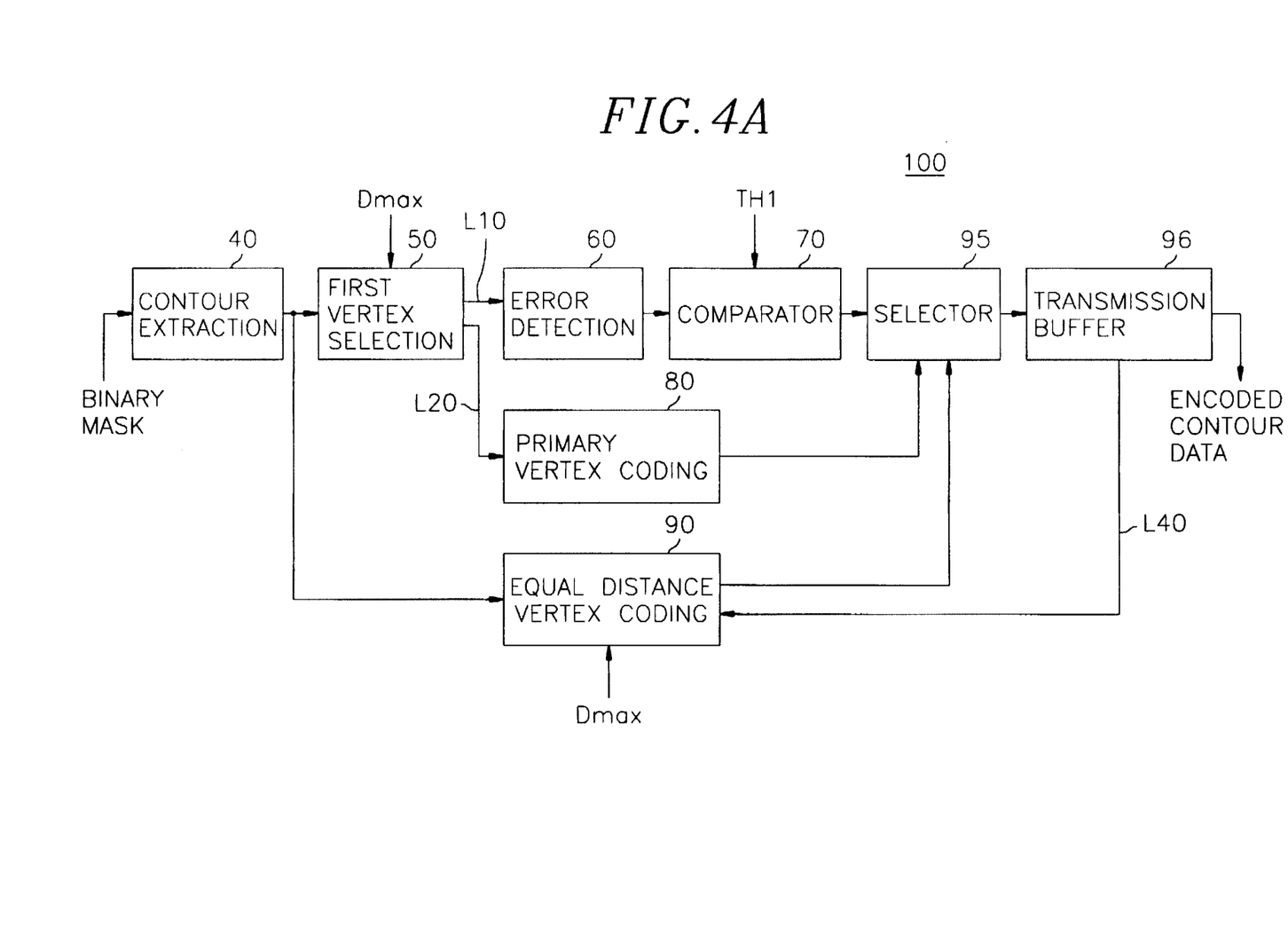
FIGS. 4A and 4B offer schematic block diagrams of apparatuses for encoding a contour of an object in accordance with the preferred embodiments of the present invention.

Referring to FIG. 4A, there is shown a schematic block diagram of an apparatus 100 for encoding a contour of an object expressed in a video signal in accordance with a preferred embodiment of the present invention.

A contour image of an object is inputted to a contour extraction block 40 in the form of a binary mask. At the contour extraction block 40, a contour of the object is extracted, wherein the contour is made of contour pixels at the boundary of the object. The contour extracted from the contour extraction block 40 is fed to a first vertex selection block 50 and an equal distance vertex coding block 90.

At the first vertex selection block 50, a plurality of primary vertices are determined on the contour through the use of a conventional polygonal approximation technique to thereby provide primary vertex data to a primary vertex coding block 80 via a line L20, the primary vertex data representing position information of primary vertices. In determining the primary vertices on the contour, a pair of contour pixels separated by a maximum distance is determined first as starting vertices; and additional contour pixels are repetitively selected as vertices until a largest perpendicular distance from a line segment joining each pair of adjacent vertices to a contour segment defined by the pair of vertices does not exceed a preset threshold Dmax. The determined vertices are then set as the primary vertices.

After determining the primary vertices, a maximum perpendicular distance from each line segment joining every two adjacent primary vertices along the contour to a contour segment corresponding thereto is determined at the first vertex selection block 50 and provided to an error detection block 60 via a line L10.

The error detection block 60 receives the maximum distance for each line segment from the first vertex selection block 50 and selects a biggest one among them, to thereby provide same to a comparator 70 as an approximation error.

The comparator 70 compares the approximation error with a predetermined threshold TH1 and provides a selector 95 with a first selection signal if the approximation error is larger than the threshold TH1 and a second selection signal if otherwise.

Meantime, the primary vertex data provided from the first vertex selection block 50 is coded at the primary vertex coding block 80 through the use of, e.g., the conventional octant-based vertex coding technique described with respect to FIG. 1 to thereby provide a coded primary vertex data to the selector 95.

The equal distance vertex coding block 90, responsive to the contour from the contour extraction block 40, determines secondary vertices on the contour and encodes same to provide coded secondary vertex data to the selector 95.

Figure 5:
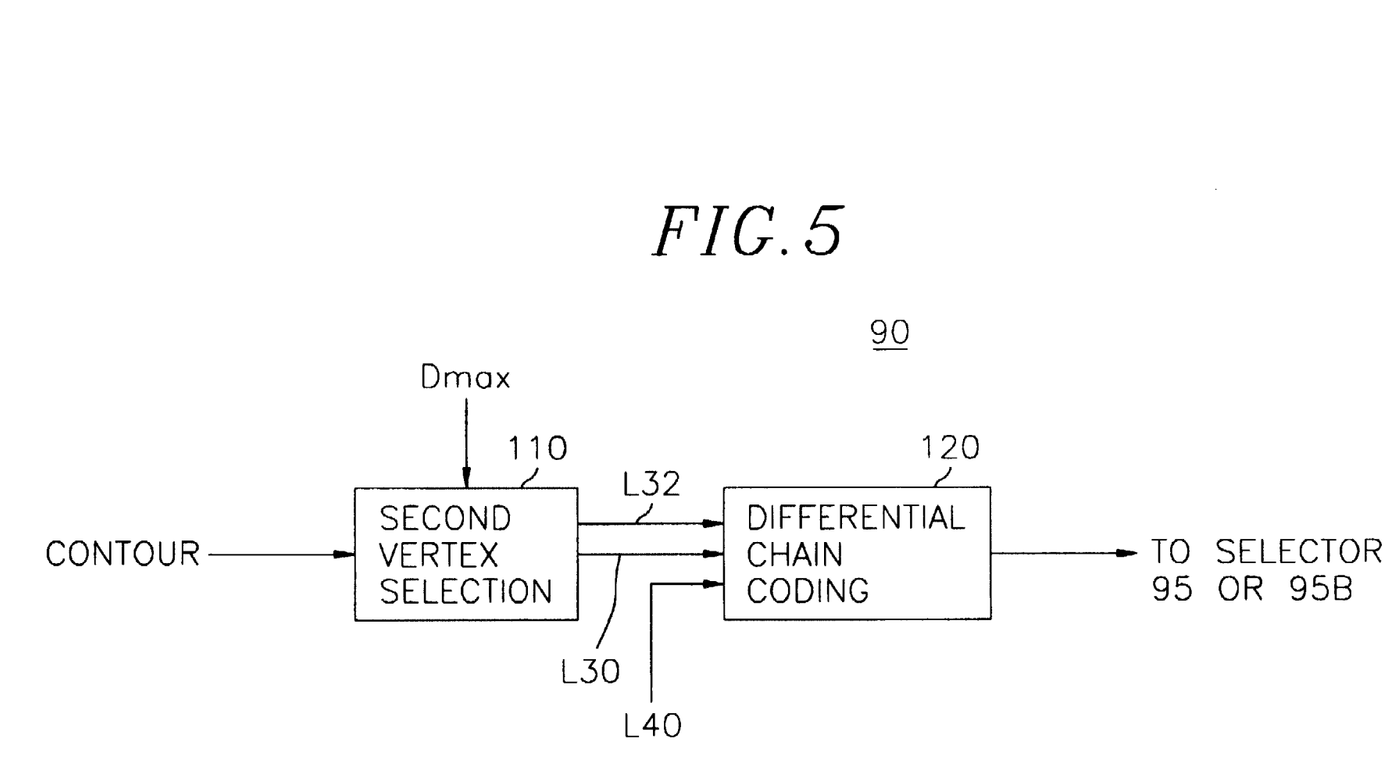
FIG. 5 depicts a detailed block diagram of an equal distance vertex coding block in FIGS. 4A and 4B.

Referring to FIG. 5, there is illustrated a detailed block diagram of the equal distance vertex coding block 90 which includes a second vertex selection block 110 and a differential chain coding block 120.

The second vertex selection block 110 determines a multiplicity of secondary vertices on the contour received from the contour extraction block 40, each secondary vertex being a contour pixel residing at one of a predetermined set of locations away from its neighboring secondary vertex. In determining the secondary vertices on the contour, a longest linear portion of the contour is detected and one of the contour pixels locating at the ends of the portion is set as a first secondary vertex. Thereafter, a search window for the first secondary vertex is established, wherein the size of the search window is (2M+1)×(2N+1) pixels and the search window has the previously determined secondary vertex at the center thereof, M and N being positive integers greater than one determined based on the threshold Dmax in the polygonal approximation. Subsequently, it is checked whether any boundary pixel of the search window coincides with contour pixels which were not determined as secondary vertices previously. If there exists only one such contour pixel, the contour pixel is newly selected as a secondary vertex. If, however, there are more than one such contour pixels at the boundary pixel locations, one of those contour pixels is selected as an additional secondary vertex according to a priority assigned to each boundary location.

Figure 6A:
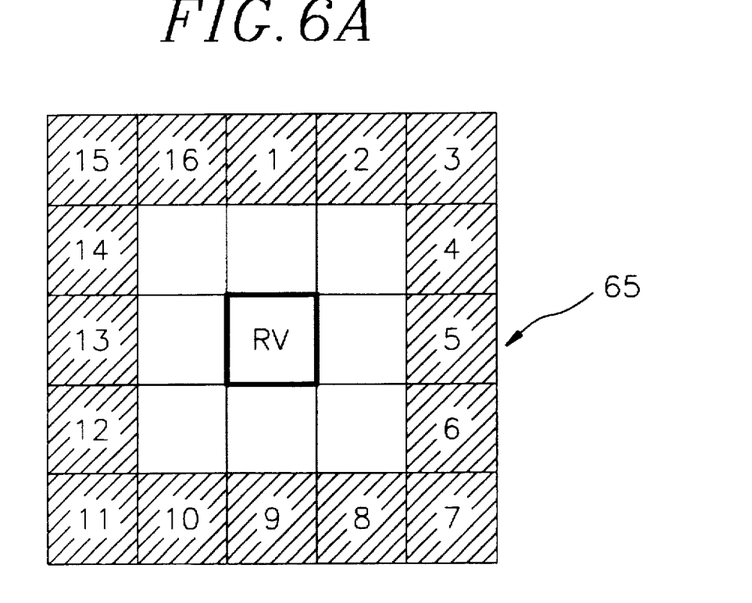
FIGS. 6A and 6B present a procedure for selecting secondary vertices at the equal distance vertex coding block in FIGS. 4A and 4B.
Figure 6B:
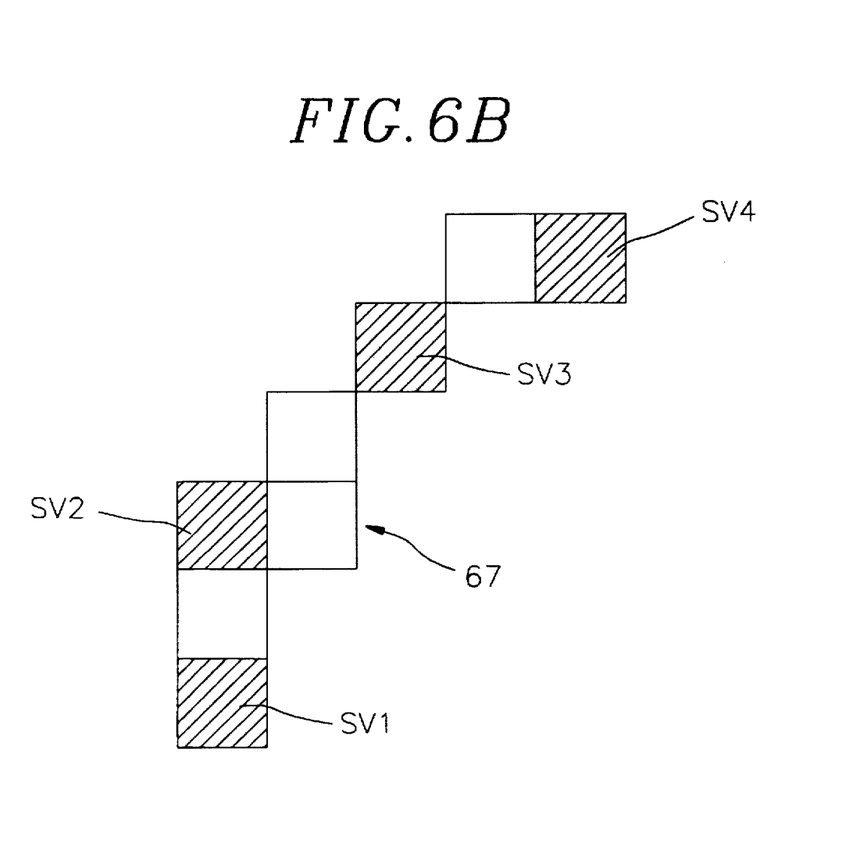
Figure 7:
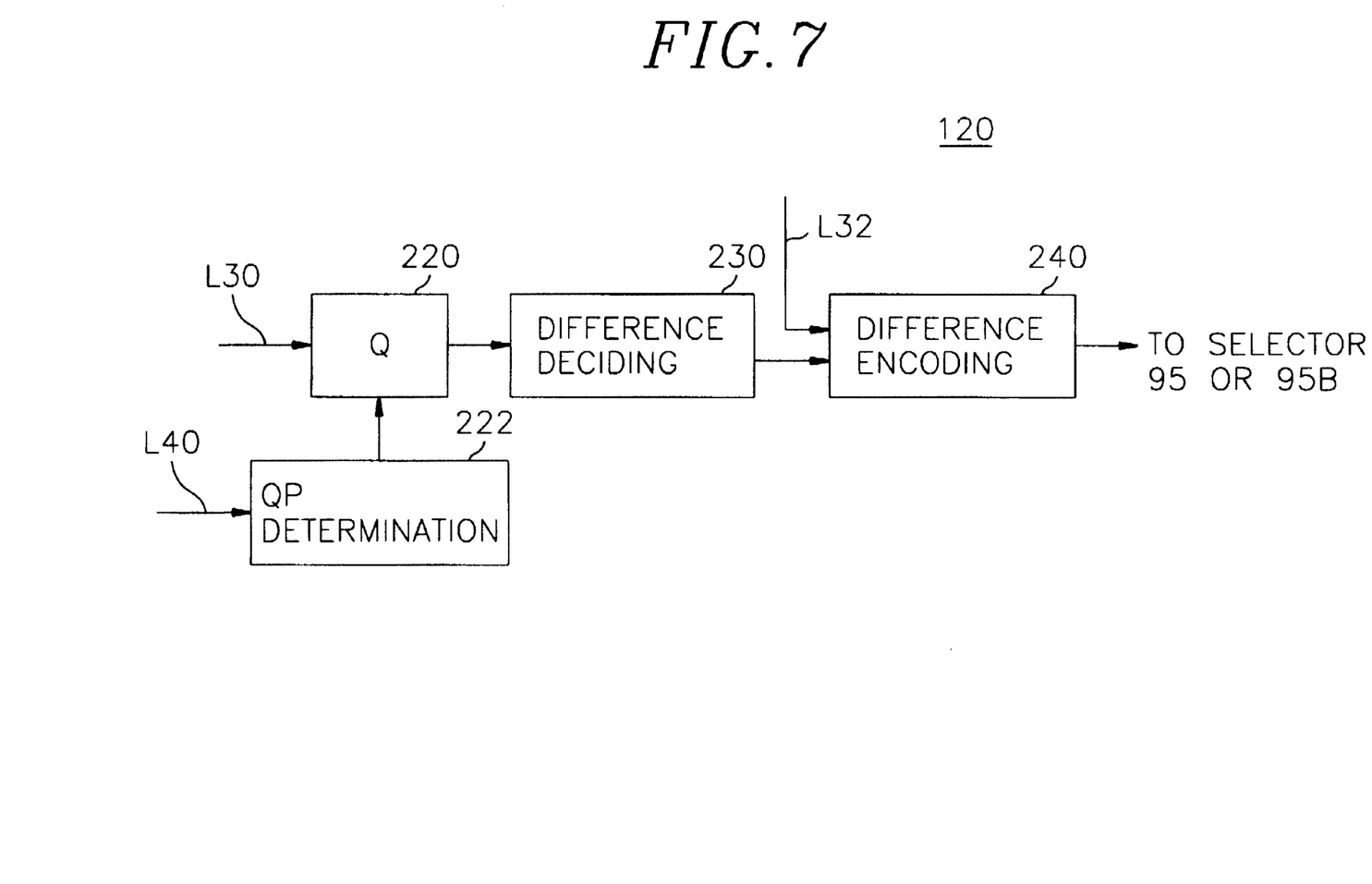
FIG. 7 represents a detailed block diagram of a differential chain coding block in FIG. 5.

As shown in FIG. 6A, if a pixel RV surrounded with bold lines is the first secondary vertex of the contour, it is examined whether each of 16 shaded boundary pixels of a search window 65 of 5×5 pixels is a contour pixel. The exemplary direction indices 1 to 15 at the boundary pixel locations represent a vertex selection priority. For instance, if there are found more than one contour pixels at boundary pixel locations, e.g., 2 to 5, the contour pixel at the location 2 is determined as a next secondary vertex. The secondary vertex determination process described above is repeated with respect to the newly selected secondary vertex until the two initially determined vertices, i.e., the first and the second secondary vertices, are subsequently detected within two subsequent search windows, respectively. In FIG. 6B, there is depicted a part of an exemplary contour 67 having therein secondary vertices SV1 to SV4 determined by using the search window of 5×5 pixels. After determining the secondary vertices on the contour, position information of the first secondary vertex and direction indices of the remaining secondary vertices are respectively provided via lines L32 and L30 to the differential chain coding block 120 which includes a quantization (Q) block 220, a quantization parameter (QP) determination block 222, a difference deciding block 230 and a difference encoding block 240 as shown in FIG. 7.

The QP determination block 222 monitors via a line L40 a buffer fullness, or occupation level in a transmission buffer 96 shown in FIG. 4 and determines a QP in a similar fashion as in the conventional quantization parameter determination scheme. The determined QP is delivered to the quantization block 220.

The direction indices on the line L30 received from the second vertex selection block 110 are quantized at the quantization block 220 in response to the QP.

Figure 8A:
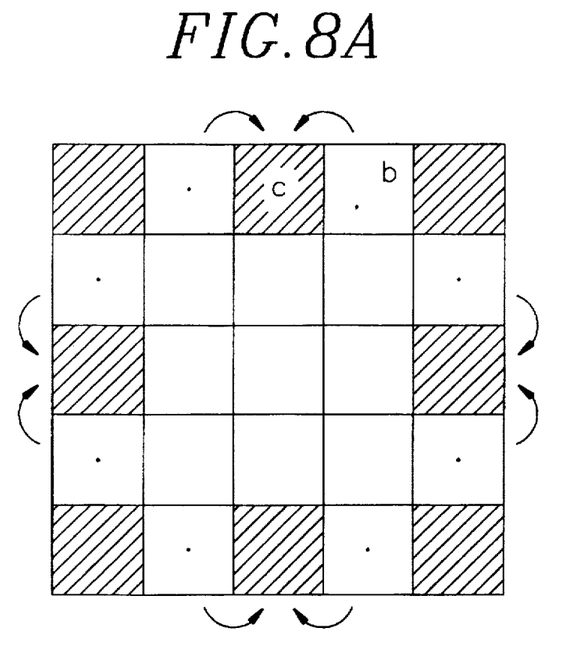
FIGS. 8A and 8B demonstrate exemplary quantization processes of a quantization block in FIG. 7.
Figure 8B:
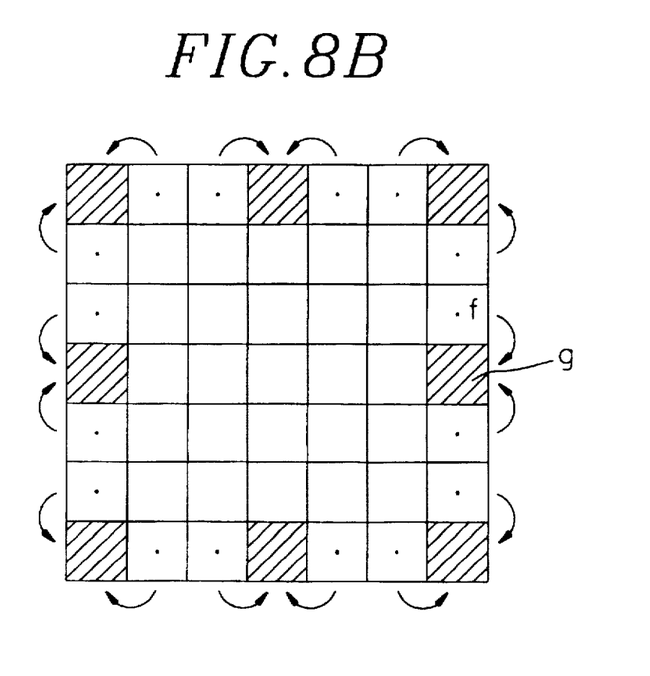

FIGS. 8A and 8B show exemplary diagrams of a quantization process of the direction indices in the cases where the search window is of 5×5 and 7×7 pixels, respectively. In FIGS. 8A and 8B, the shaded rectangles depict representative boundary pixels, wherein the boundary pixels are located at the corners and predetermined positions of the edges of the respective search windows. During the quantization process, direction indices of the secondary vertices at the non-representative boundary pixel locations marked by dots, e.g., b and f, are represented by direction indices of their adjacent representative boundary pixels, e.g., c and g. The direction indices of the representative boundary pixels are then reindexed to provide representative indices therefor. By quantizing the direction indices in this way, total 16 and 24 direction indices are reduced into 8 representative indices, respectively, as shown in FIGS. 8A and 8B.

The number of the representative boundary pixels or the representative indices is controlled by the QP. That is, if the QP indicates that the buffer fullness or occupation level is high, the number of the representative boundary pixels is reduced or vice versa. In the preferred embodiment of the invention, the upper bound of the number of the representative boundary pixels is set as the number of all boundary pixels in the search window. The lower bound is set to 8. In such a case, any secondary vertex is represented by one of eight representative boundary pixels located at four corners and at the centers of the four edges of the search window, regardless of the size thereof as shown in FIGS. 8A and 8B.

The difference deciding block 230 decides differential indices based on the representative indices received from the quantization block 220 to thereby provide same to the difference encoding block 240, each of differential indices representing a difference between magnitudes of two consecutive representative indices.

The difference encoding block 240 encodes the position information of the first secondary vertex on the line L32 and the differential indices based on a conventional variable length coding technique or a syntax-based arithmetic coding method, to thereby provide coded secondary vertex data to the selector 95.

The selector 95 selects the coded primary vertex data in response to the first selection signal and the coded secondary vertex data if the second selection signal is inputted thereto; and provides the selected data to the transmission buffer 96 as encoded contour data. The encoded contour data is transmitted via the transmission buffer 96 to a transmitter (not shown) for the transmission thereof.

Figure 4B:
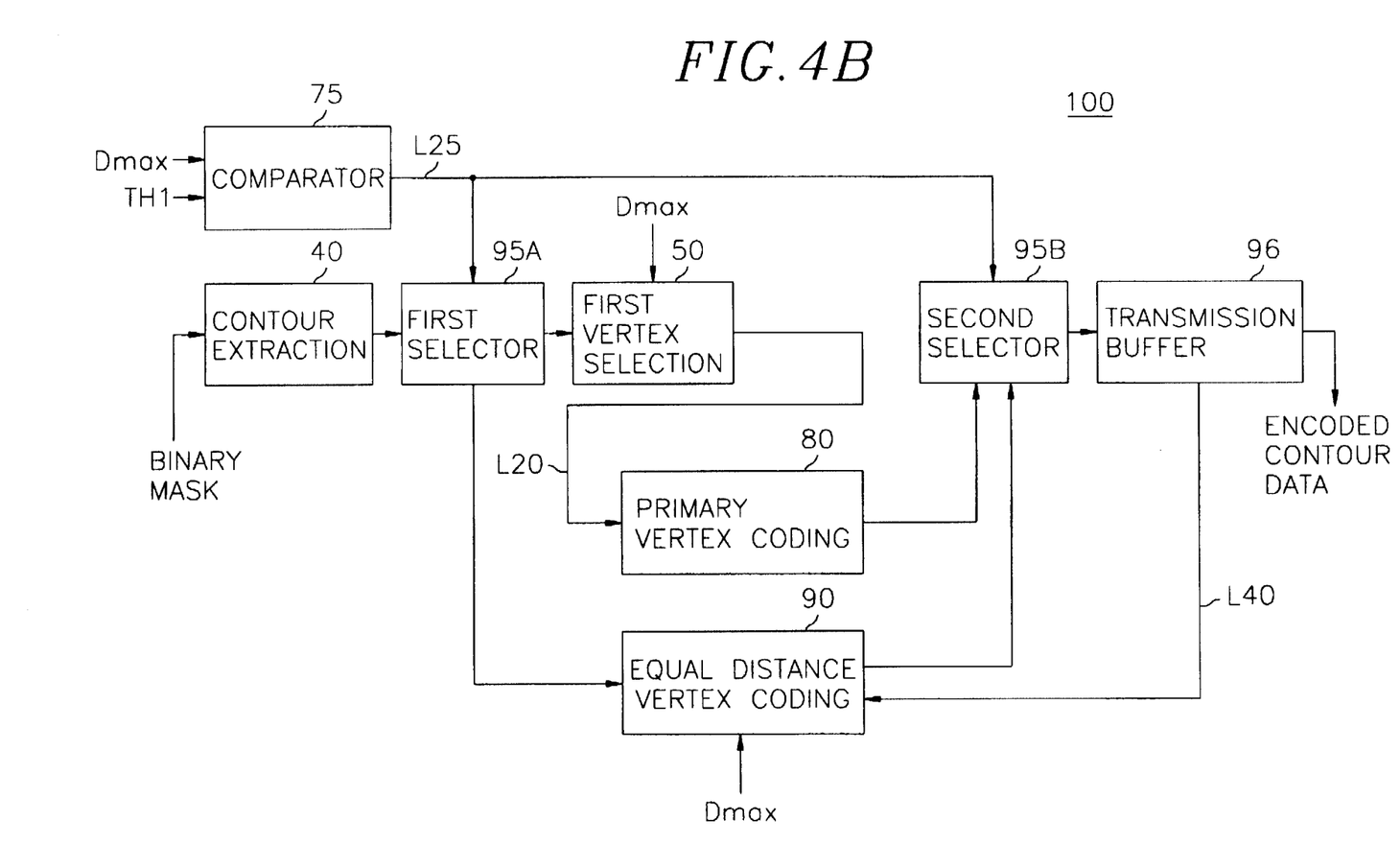

Referring to FIG. 4B, there is shown a schematic block diagram of the apparatus 100 in accordance with another preferred embodiment of the invention.

A comparator 75 compares, in lieu of the approximation error in the preferred embodiment, the threshold Dmax with the threshold TH1 and issues via a line L25 the first selection signal if the Dmax is greater than the TH1 and the second selection signal if otherwise. In response to the selection signals, a first and a second selectors 95A and 95B perform their operations. That is, the contour retrieved from the contour extraction block 40 is delivered to the first vertex selection block 50 via the first selector 95A in response to the first selection signal and coupled to the equal distance vertex coding block 90 by the second selection signal. Meanwhile, the selection process of the second selector 95B is identical to that of the selector 95 in FIG. 4A. In FIGS. 4A and 4B, the blocks having the same reference numerals carry out same operations and, therefore, the illustrations thereof are omitted.

While the present invention has been described with respect to the particular embodiments, it will be apparent to those skilled in the art that various changes and modifications may be made without departing from the spirit and scope of the invention as defined in the following claims.

What is claimed is:

1. A method for encoding a contour of an object, the contour having contour pixels thereon, comprising the steps of:

(a) deciding a multiplicity of primary vertices on the contour, wherein the contour is divided into a multiple number of primary contour segments, each primary contour segment having a pair of primary vertices at the ends thereof, and a perpendicular distance from a line segment joining the pair of primary vertices to any point of said each primary contour segment being smaller than a threshold Dmax;

(b) sequentially determining a plurality of secondary vertices on the contour, wherein the contour is partitioned in a plurality of secondary contour segments, each secondary contour segment having a pair of secondary vertices at the ends thereof, a secondary vertex being disposed at one of a predetermined set of locations away from a previously determined secondary vertex and a distance between two neighboring secondary vertices being greater than one pixel;

(c) encoding position information of the primary vertices to provide encoded primary vertex data;

(d) encoding position information of the secondary vertices to provide encoded secondary vertex data;

(e) estimating an encoding error to compare with a threshold TH; and (f) providing, as encoded contour data, the encoded primary vertex data if the encoding error is greater than the threshold TH, and the encoded secondary vertex data if otherwise.

2. The method as recited in claim 1, wherein the encoding error is equal to the threshold Dmax.

3. The method as recited in claim 1, wherein the determining step (b) includes the steps of:

(b1) setting one of the contour pixels as a first secondary vertex;

(b2) forming a search window for the first secondary vertex, the search window being of (2M+1)×(2N+1) pixels and having the first secondary vertex at the center thereof, M and N being positive integers greater than 1, respectively;

(b3) setting pixels at the corners and the edges of the search window as boundary pixels;

(b4) setting a contour pixel at one of boundary pixel locations as a newly determined secondary vertex; and (b5) repeating the steps (b2) to (b4) with respect to the newly determined secondary vertex.

4. The method as recited in claim 3, wherein the determining step (b) further includes, after the step (b5), the steps of:

(b6) representing each non-first secondary vertex by one of predetermined boundary pixels in the search window, each predetermined boundary pixel having a representative index;

(b7) generating representative indices of predetermined boundary pixels representing the non-first secondary vertices as secondary vertex information; and (b8) providing position data of the first secondary vertex and the secondary vertex information as the position information of the secondary vertices.

5. The method as recited in claim 4, wherein M and N are determined based on the threshold Dmax.

6. The method as recited in claim 5, wherein the encoding step (c) is carried out by an octant-based vertex coding technique.

7. The method as recited in claim 6, wherein the encoding step (d) includes the step of computing a differential value between representative indices of neighboring secondary vertices.

8. The method as recited in claim 1, wherein the estimating step (e) includes the steps of:

(e1) calculating a maximum perpendicular distance between each primary contour segment and its corresponding line segment to provide a multiple number of maximum perpendicular distances; and (e2) setting a largest maximum perpendicular distance as the encoding error.

9. The method as recited in claim 8, wherein the encoding step (c) is carried out by an octant-based vertex coding technique.

10. The method as recited in claim 9, wherein the encoding step (d) includes the steps of:

(d1) choosing one of the secondary vertices as a first secondary vertex;

(d2) determining representative indices for the remaining secondary vertices, each representative index representing a relative position of a secondary vertex with respect to one of the neighboring secondary vertices thereof; and (d3) encoding position information of the first secondary vertex and representative indices of the remaining secondary vertices to thereby provide encoded data as the coded secondary vertex data.

11. A method for encoding a contour of an object, the contour having contour pixels thereon, comprising the steps of:

(a) determining one of the contour pixels as a first vertex;

(b) forming a search window for the first vertex, the search window being of (2M+1)×(2N+1) pixels, the search window having 2×(2M+2N) boundary pixels along a periphery thereof and including the first vertex at the center thereof;

(c) detecting a contour pixel disposed at one of boundary pixel locations and determining same as a next vertex;

(d) choosing predetermined boundary pixels as representative pixels and assigning a direction index for each representative pixel, the direction index representing a relative direction of each representative pixel with respect to the first vertex;

(e) representing the next vertex by a direction index for one of the representative pixels;

(f) repeating the steps (b) to (e) with respect to the next vertex to thereby generate a plurality of vertices approximating the contour; and (g) encoding position information for the first vertex and direction indices for the remaining vertices to provide same as encoded vertex data.

12. The method according to claim 11, wherein the first vertex is one of two contour pixels at the ends of a longest linear portion of the contour.

13. The method according to claim 11, wherein the repeating step (f) terminates if the first two vertices determined at the steps (a) and (c) are subsequently found again in the search windows in the process of detecting additional vertices.

14. The method according to claim 13, wherein the encoding step (g) includes the steps of:

(g1) computing a differential value between direction indices of each pair of vertices; and (g2) encoding the position information for the first vertex, a direction index of the second vertex and differential values for the rest of the vertices to thereby provide the encoded vertex data.

15. The method according to claim 14, wherein the differential values are encoded by a variable length coding technique or a syntax-based arithmetic coding technique.

16. An apparatus for encoding a contour of an object, the contour including contour pixels thereon, comprising:

- means, responsive to a first control signal, for polygonal approximating the contour with a multiplicity of primary vertices, wherein the contour is divided into a multiple number of first contour segments, each having two primary vertices at the ends thereof and being represented by a line segment joining the two primary vertices, and a maximum perpendicular distance between each first contour segment and the line segment being smaller than a threshold Dmax;
- a first coder for encoding position information of the primary vertices to thereby provide same as encoded contour data;
- means, responsive to a second control signal, for sequentially determining a plurality of secondary vertices on the contour and providing position information of the secondary vertices, a secondary vertex being disposed at one of predetermined locations more than one pixel away from its previously determined secondary vertex;
- a second coder for encoding the position information of secondary vertices to provide same as the encoded contour data; and
- means for comparing the Dmax with a threshold TH and generating the first control signal if the Dmax is greater than the TH and the second control signal if otherwise.

17. The apparatus according to claim 16, wherein said means for sequentially determining the secondary vertices includes:

- means for deciding one of the contour pixels as a first secondary vertex;
- means for sequentially selecting, as a next secondary vertex, a contour pixel positioned at one of a set of preset locations away from a previously determined secondary vertex;
- means for representing the selected contour pixel by one of the predetermined locations, the predetermined locations being a subset of the preset locations;
- means for providing a direction index for said one of the predetermined locations as position information for a next secondary vertex; and
- means for providing, as the position information of the secondary vertices, a position of the first secondary vertex and position data for the remaining secondary vertices which includes a second secondary vertex.

18. The apparatus according to claim 17, wherein the second coder includes:

- means for computing a differential value between direction indices of each pair of sequentially determined secondary vertices; and
- means for encoding the position of the first secondary vertex, a direction index of the second secondary vertex and differential values for the remaining secondary vertices to thereby provide encoded data as the encoded contour data.

* * * * *